United States Patent
Rimkus et al.

(10) Patent No.: US 7,215,243 B2
(45) Date of Patent: May 8, 2007

(54) TIRE PRESSURE CHARACTERIZATION METHOD AND KEY FOB

(75) Inventors: Robert A Rimkus, Macomb, MI (US); Allen J. Walenty, Macomb, MI (US)

(73) Assignee: General Motors Corporation, Detroit, MI (US)

( * ) Notice: Subject to any disclaimer, the term of this patent is extended or adjusted under 35 U.S.C. 154(b) by 212 days.

(21) Appl. No.: 10/939,551

(22) Filed: Sep. 13, 2004

(65) Prior Publication Data

US 2006/0055522 A1    Mar. 16, 2006

(51) Int. Cl.
*B60C 23/00* (2006.01)

(52) U.S. Cl. ............ 340/442; 340/447; 137/224; 73/146

(58) Field of Classification Search ........ 340/443–449; 73/146, 146.2, 146.5; 116/42 R, 34 A, 34 B, 116/34 R
See application file for complete search history.

(56) References Cited

U.S. PATENT DOCUMENTS 5,463,374 A * 10/1995 Mendez et al. ............ 340/442
6,148,888 A * 11/2000 Loureiro Benimeli ...... 152/415
6,745,623 B2 * 6/2004 Schmitt ........................ 73/146
6,745,624 B2 * 6/2004 Porter et al. ............... 73/146.2
6,826,508 B2 * 11/2004 Fujioka ....................... 702/138
7,009,491 B2 * 3/2006 Rodriguez et al. ......... 340/5.72
7,024,928 B1 * 4/2006 Chen ......................... 73/146.8
7,092,804 B2 * 8/2006 McQuade et al. ............ 701/29
2003/0164759 A1 * 9/2003 Nantz et al. ................. 340/442
2003/0217595 A1 * 11/2003 Banzhof et al. ........... 73/146.8
2005/0099274 A1 * 5/2005 Tranchina .............. 340/426.15

* cited by examiner

*Primary Examiner*—Jeffery Hofsass
*Assistant Examiner*—Hoi C. Lau
(74) *Attorney, Agent, or Firm*—Timothy J. Marsh

(57) ABSTRACT

The present invention provides an apparatus and method for characterizing tire pressure on the four tires of a conventional passenger automobile. The method uses an apparatus disposed on a key fob. The key fob includes a tire valve stem interface that is capable of taking manual measurements of tire pressure. The fob further includes a pressure transducer that translates tire pressure into electronic form where it can be displayed on an LCD screen and transmitted by RF to an automobile computer. The automobile computer further includes a program that provides for the measurement of tire pressure in a sequential method thereby assuring that the tires are at placarded pressure or more. The method includes steps of using the key fob to measure the tire pressure and transmitting the tire pressure to the computer for processing.

5 Claims, 5 Drawing Sheets

TIRE PRESSURE CHARACTERIZATION METHOD AND KEY FOB

TECHNICAL FIELD

The present invention relates to methods for measuring vehicular tire pressure. More particularly the invention relates to a method that prevents customers from initiating an invalid tire characterization sequence by using an integrated tire pressure gauge and RF transmitter key fob. The method verifies that the tire pressure at each corner of a vehicle is greater than or equal to placard pressure before allowing the tires to be characterized.

BACKGROUND

In 2000 the United States Congress enacted a bill under the title Transportation Recall Enhancement, Accountability, and Documentation (TREAD) Act. One aspect of this law called for the Department of Transportation to initiate rule-making related to tire inflation. Proposed rulemaking requires implementation of a warning system in new motor vehicles that indicates to the operator when a tire is significantly under-inflated.

Two types of Tire Pressure Monitoring (TPM) systems have been developed in response to this legislation. These are direct and indirect systems. Direct systems generally operate with a tire pressure sensor in each tire cavity. Indirect TPM systems generally monitor under-inflation by comparing characteristics of tires such as wheel speed. Each such system has limitations. It has now been discovered that a hybrid TPM system offers improvements over these known methods of tire pressure measurement.

One shortcoming of the presently known systems relates to starting tire pressure. An indirect system requires that all of the tires be filled to their nominal pressures. Vehicle manufacturers recommend that tires be filled to placard (for example, 30 PSI) pressure when cold. Typically this requires that a vehicle remain stationary for at least 1 hour. After a vehicle has been driven for more than 20 minutes at speeds between 50 and 100 KPH, manufacturers recommend adjusting all tire pressures to placard plus an additional 4 PSI. This additional pressure accommodates for the friction related heat and pressure increase that occurs in all tires while driving.

Both prior art systems allow tire characterization anytime the reset function or switch is properly deployed even if the tires are not at nominal pressures. The shortcoming lies in the fact that those systems have no direct way to ensure proper inflation levels before starting the characterization procedure. For example, in an indirect system actual pressures that are significantly off of recommended inflation levels can yield the same ratios as do tires with proper inflation. In that case underinflated tires are indistinguishable from each other. The following cases illustrate how differing inflations can nevertheless have similar ratios. (Here, and elsewhere in the application, the convention is used where LF, RF, LR, and RR mean, respectively left front, right front, left rear, and right rear in a conventional, four tire automobile arrangement.)

| CASE 1 | | CASE 2 | |
|---|---|---|---|
| LF = 18 | RF = 17.25 | LF = 30.6 | RF = 29.3 |
| LR = 18.5 | RR = 20 | LR = 31.4 | RR = 34 |

In the above example, the system will compare pressures in each tire. The pressure ratios of both Case 1 and Case 2 are similar. Thus the driver will not be warned of a low pressure situation. This represents a worst-case scenario for indirect systems. It relies on the customer to ensure that the tire pressures are optimal before executing a tire characterization procedure.

Hence there is a need for an improved tire pressure measurement system. There is a need for a pressure measurement system that can determine tire pressure at any time, regardless whether the car has been running or not, and regardless whether the actual tire pressure is greater than or less than the placard pressure. Additionally there is a need for a pressure measurement system that individually reports pressure for each of four tires. Further there is a need for a pressure measurement system that visually reports pressure readings to a driver/user. Finally, there is also a need for an improved TPM system that integrates into present operator equipment such as key fobs and remote keyless entry (RKE) systems. The present invention addresses one or more of these needs.

BRIEF SUMMARY

The present invention provides a hybrid Tire Pressure Monitoring (TPM) System. The hybrid TPM system combines a direct tire pressure transducer(s) with an indirect TPM system. This combination allows for detection of four tires that are similarly and simultaneously in a low pressure condition.

In one embodiment, the indirect system uses wheel speed data to determine low tire conditions through measurement of the rolling radius of any single tire, any two tires, or any three tires. With such an indirect system a direct pressure sensor may be added to the system to detect the 4-tire low scenario. Many indirect method improvements are possible when the algorithm knows where the TPM sensor is located. If a customer rotates their own tires in an incorrect pattern that does not match the recommendation in the vehicle owner's manual the algorithm will falsely infer tire pressures that are incorrect.

There is further described a methodology and an integrated Tire Pressure Gauge (TPG) with an LCD display and RF Transmitter Key fob that transmits actual tire pressure on each corner to the Remote Function Actuator (RFA) to improve the functionality and accuracy of the indirect portion of the hybrid system.

In one embodiment, and by way of example only, there is provided a method for characterizing tire pressure comprising the steps of: measuring the pressure of a first tire with a tire valve stem interface disposed on a key fob; sending tire pressure information by radio frequency from a key fob to a remote function actuator; allowing a time period to add air pressure to the first tire; approving the first tire when its pressure meets or exceeds placard pressure; repeating the above steps for a second tire, a third tire, and a fourth tire; and characterizing tire pressure when all four tires are approved. The method may also include a step of activating a secondary functionality on a set of key fob buttons corresponding to four tires. The time period allowed for adding air pressure may be set to approximately two minutes. An electronic flag marker may be set that corresponds to a tire to indicate that the tire pressure meets or exceeds placard pressure. An audible signal to the driver the horn may chirp when tire pressure exceeds placard pressure. Additionally a series of horn chirps may sound when the pressure of each tire meets or exceeds placard pressure. A series of horn chirps may also signal that a tire pressure verification mode has been cancelled. Tire characterization may only proceed when the pressure of each of four tires meets or exceeds placard pressure.

In a further embodiment, also by way of example, there is provided a method for authorizing a tire pressure characterization comprising the steps of: measuring the air pressure in a left front tire; setting a flag marker approval corresponding to the left front tire when the air pressure in the left front tire meets or exceeds placard pressure; measuring the air pressure in a right front tire; setting a flag marker approval corresponding to the right front tire when the air pressure in the right front tire meets or exceeds placard pressure; measuring the air pressure in a left rear tire; setting a flag marker approval corresponding to the left rear tire when the air pressure in the left rear tire meets or exceeds placard pressure; measuring the air pressure in a right rear tire; setting a flag marker approval corresponding to the right rear tire when the air pressure in the right rear tire meets or exceeds placard pressure; and testing whether flag marker approvals exist for all four tires; authorizing a characterization when all four tires have approved flag markers. The method may further comprise the step of determining engine status. The tire pressure verification mode may commence by simultaneously depressing two keys on a key fob. An audible feedback may indicate that the tire pressure verification mode is selected. Alternatively a tire pressure characterization sequence may commence by placing the ignition in position 2 and simultaneously depressing the odometer reset button. The method may transmit tire pressure to a remote function actuator by radio signal. A timer may reset to two minutes when a transmit on change of pressure greater than 1 PSI occurs.

In a further embodiment, still by way of example, there is provided a key fob for use in measuring a tire pressure comprising: a key fob body having a top and side orientation; a valve stem interface disposed on said key fob body; a pressure transducer disposed on said key fob body such that said transducer creates electronic signals corresponding to pressure data received from the valve stem interface; and an LCD display screen that visually displays pressure information received from the pressure transducer. The valve stem interface and pressure transducer may be disposed on the top or side of the key fob. The pressure transducer generates a signal corresponding to the air pressure measured by the valve stem interface.

In a further embodiment, still by way of example only, there is provided a key fob with functionality for activating a tire pressure characterization sequence comprising: a key fob body wherein said key fob body has a front and rear orientation; a first button disposed on said key fob body corresponding to a left front tire position; a second button disposed on said key fob body corresponding to a right front tire position; a third button disposed on said key fob body corresponding to a left rear tire position; a fourth button disposed on said key fob body corresponding to a right rear tire position; a means for transmitting radio frequencies carrying tire pressure information corresponding to left front, right front, left rear, and right rear tires to a remote function actuator. The first button is disposed on the left front of the key fob body, the second button is disposed on the right front of the key fob body, the third button is disposed on the left rear of the key fob body, and the fourth button is disposed on the right rear of the key fob body.

Other independent features and advantages of the hybrid tire pressure monitoring system will become apparent from the following detailed description, taken in conjunction with the accompanying drawings which illustrate, by way of example, the principles of the invention.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

Figure 1:
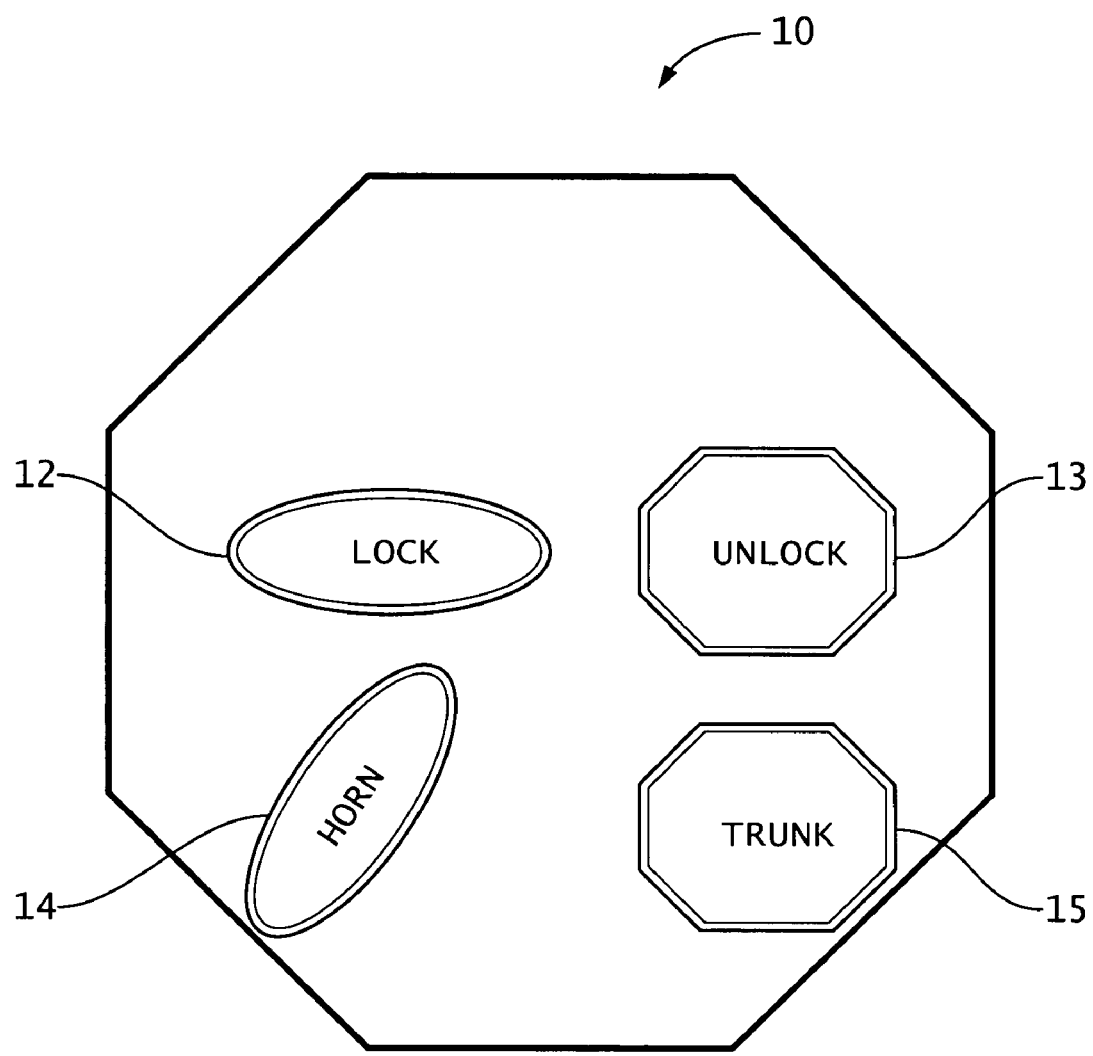
FIG. 1 is a schematic view of a key fob that shows typical button orientation.

A diagram of a typical key fob with RF capability is shown in FIG. 1. The fob 10 includes keys. A typical arrangement includes a key to activate a lock function 12, an unlock function 13, a horn function 14, and a trunk function 15. A key fob contains an RF transmitter that sends wireless commands to a remote function actuator (RFA). The RFA functions correspond to the fob buttons and include locking/unlocking doors, opening trunk, sounding panic alarm, opening the trunk, etc. Some low-end vehicles will not have these functions, but all vehicles will have an RFA module for reception from the TPM sensor(s)/transmitter.

Figure 2A:
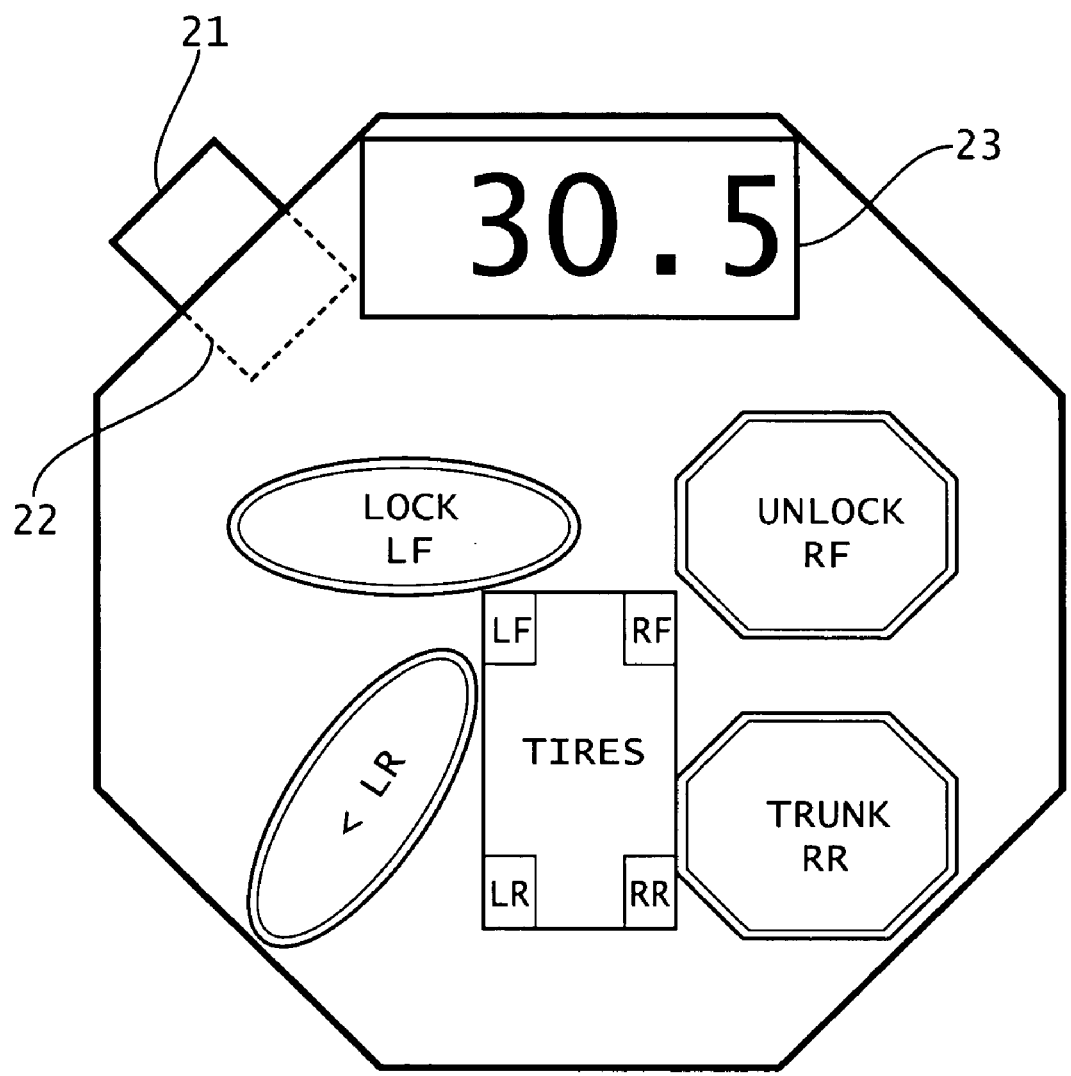
FIG. 2A is a schematic view of a key fob according to an embodiment of the present invention.
Figure 2B:
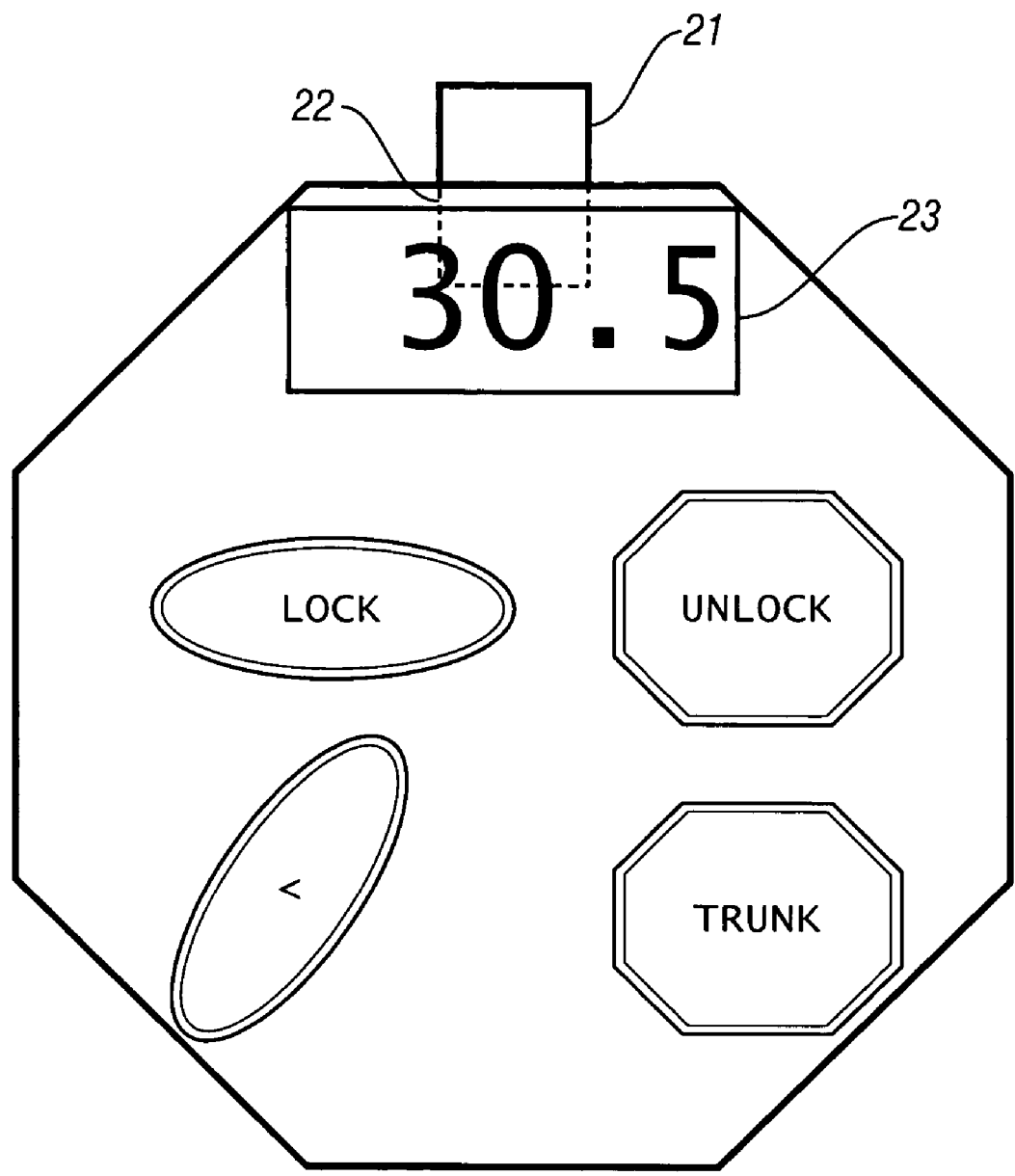
FIG. 2B is a schematic view of a key fob according to an additional embodiment of the present invention.

In one embodiment of the present invention a fob is reconfigured to include additional functionality. An illustration of the fob is shown in FIG. 2A. A pressure transducer 22 is added to a key fob along with a standard tire-valve housing interface 21. An LCD display 23 is also included on the fob. In one embodiment, that of FIG. 2A the valve stem interface 21 is attached at an angle. In another embodiment, that of FIG. 2B, the valve stem interface is positioned in a central or top position of the fob. Other configurations of the interface 21 and LCD display 23 are also possible. In a preferred embodiment the valve stem tire interface 21 and LCD 23 together act as a digital pressure gauge, with the LCD 23 indicating a tire's pressure.

The tire valve stem interface 21 may be manually inserted into a standard tire stem. The interface 21 receives a measure of the tire pressure. The tire pressure is visually displayed on the LCD 23. Additionally, the tire pressure information is sent via wireless broadcast from the fob to the RFA. The RFA module will send the data to the indirect algorithm host (BCM) module via serial data communications.

Since a typical hybrid indirect tire pressure monitoring system will not know the actual pressure of each tire, an external tire pressure gauge with a transmitter will allow improvements while performing normal checking or adjusting tire pressure. Since fobs are carried with the vehicles keys, the driver will always have a tire pressure gauge with them.

In a further embodiment of the present invention, the TPM system can characterize the pressure condition of the vehicle's tires. The pressure characterization initiates a series of requests and commands. Activation of a request for tire characterization lies within the fob and tire pressure gauge.

The RFA distinguishes between each functional fob button by recognizing its own special code or frequency. The fob tire pressure monitor circuit also has its own special code or frequency and is designated to transmit on a pressure change of +/−1 PSI. Because the customer will have their keys at ambient barometric pressure (in a pocket or purse) the tire pressure monitor circuit will always be at 0 PSI. Transmissions from the key fob will be recognized by the RFA module and perform the RFA functions. The tire pressure measurement function will never be processed unless a customer places the fob's tire valve interface on a vehicle tire valve stem and presses firmly. The TPM circuit will register the increase in pressure and immediately transmit the tire pressure to the RFA. A predetermined set of functional sequences needs to be enacted to initiate tire characterization. If the sequence is not met it will be assumed that the customer was only checking the tire pressures and does not wish to characterize the tires.

In a first embodiment, the tire characterization utilizes a functional key fob, a key fob such as shown in FIG. 2A that includes specialized fob buttons for taking the pressure sequence. The tire characterization sequence combines human actions with automated actions.

The sequence is started by an action of the driver at the fob. A preferred embodiment includes the driver holding down the fob's Lock & Unlock buttons at the same time for more than 3 seconds. If no such fob buttons exist (or alternatively) the sequence may be started by putting the key in the ignition 2 position and resetting the trip odometer by holding it down. Doing so activates a horn response of three chirps: chirp, chirp, chirp. Alternative initiation methods may also be used.

At this point the customer/driver begins to measure tire pressure. The method preferably begins with a specific tire such as the LF tire. The customer thus measures LF tire pressure by engaging the tire valve stem interface with the valve stem for that specific tire. The fob receives and measures the pressure. If the LF pressure is at less than placard, the method allows the customer 2 minutes in which to pressurize the tire. The 2 minute timer has an additional advantage in that it allows for re-measurement of a tire that is actually at placard pressure but was incorrectly measured due to improper seating of the tire pressure gauge on the tire valve system.

The same method is then repeated for the remaining tires. A preferred sequence proceeds to RF, RR, and LR, although other orders are possible.

In a preferred embodiment, the key fob includes buttons that correspond to each of the four tires, e.g. LF (Lock button). RF (Unlock button), RR (Trunk button), and LR (Panic button) in any order. This is illustrated in FIG. 2A where, for example, a diagram of the four tires shows how the position of the buttons according to the fobs upright orientation also corresponds to the indicated buttons.

In one embodiment, a LF flag or bit is set to true (Tire flag=4 bit binary number, LF=bit 0=0001, RF=bit 1 0010, LR=bit 3 0100 & RR=bit 4 1000) whenever the LF PSI is greater than placard.

When all bits equal true (binary 1111=15=$F) and the in-tire TPM sensor is greater than placard pressure, then the tire characterization is initiated. Testing the TPM sensor prevents a customer from taking a short cut of measuring one tire four times.

Figure 3:
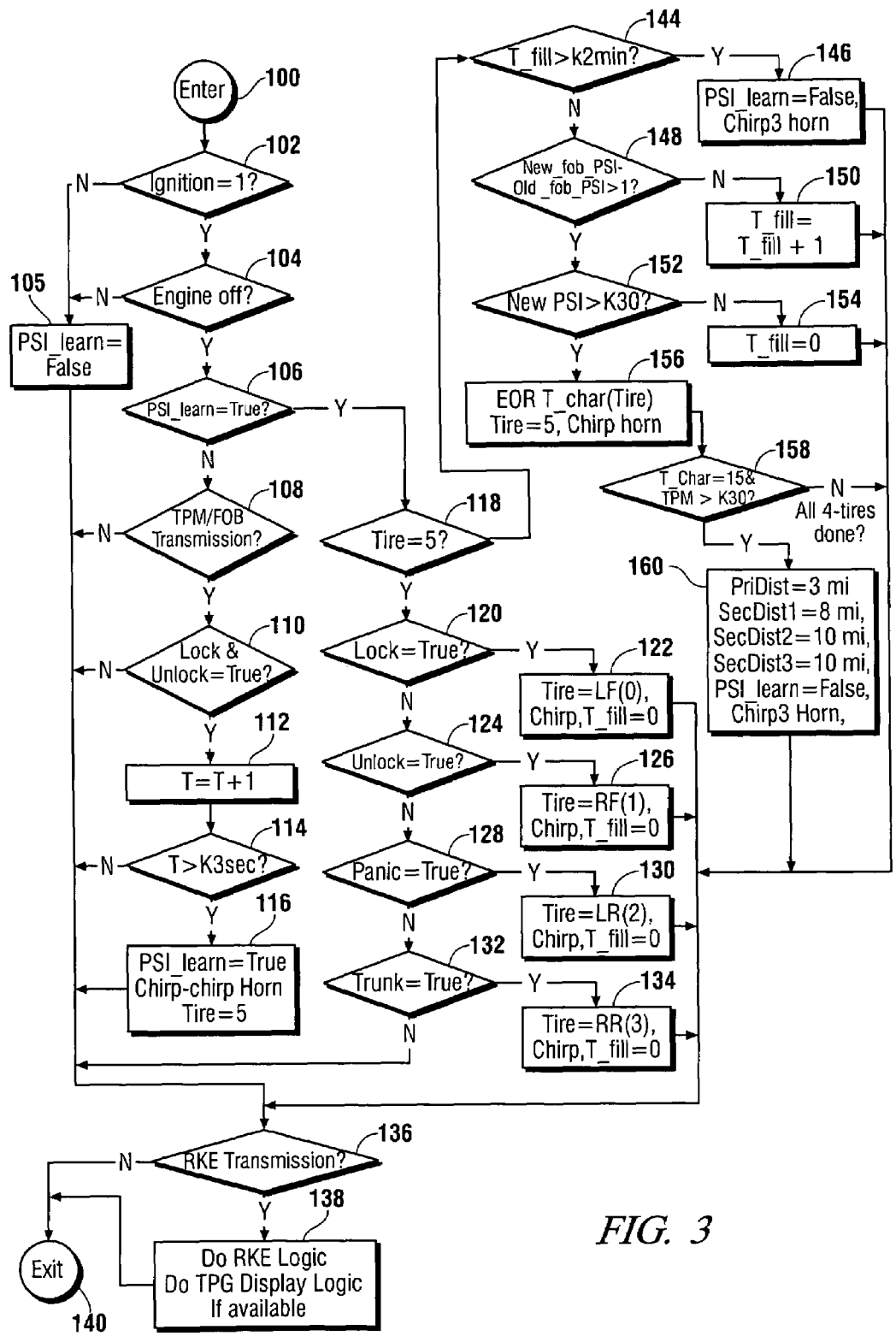
FIG. 3 is a logical flow chart showing a tire characterization method according to an embodiment of the present invention.

The preferred method is further illustrated in the following description of the method's logical flow chart. Referring to FIG. 3, the method begins at block 100. The preferred embodiment first determines engine status. If at block 102 the vehicle key is not in the ignition, i.e. ignition is off (ignition 1) and if at block 104 the engine is not running the method proceeds to block 106 which determines if the tire pressure verification mode is active. If the ignition is not off or the engine is running the method automatically sets the status of the verification mode to inactive at block 105 and then proceeds to the normal RFA processing at block 136. If at block 106 the tire pressure verification mode is active the method jumps to the corner selection method at block 118. If the mode is inactive block 108 checks for a transmission from the key fob to the RFA module. If no transmission was received the method proceeds to block 136 which handles the normal functions of the RFA. If at block 108 the fob is transmitting the method determines at block 110 if a request to initiate tire pressure verification mode is being commanded by determining if a customer is holding down the lock and unlock buttons on the key fob simultaneously. If these two buttons are being held down the method increments a timer clock 112. If both buttons are not being held down the method jumps to block 136. If at block 114 the timer exceeds timer, K3Sec, (about 3-seconds) the method activates the tire pressure verification mode, sets tire select flag, Tire, to 5 (nonexistent corner, means corner not yet selected by fob button), and provides an audible feedback to the customer by chirping the horn twice at block 116. The method then proceeds to RFA function block 136.

Once the verification mode is activated the method provides additional functionality to each key fob function button to expedite the tire pressure measurement and verification process, which enables the initiation of tire characterization. The four function buttons will be used to identify the tire being measured in a pattern consistent (see FIG. 2A.) with the position of the vehicle tires. If at block 118 the tire select flag, Tire, is equal to 5 method executes methodology at block 120 through 134 which waits for a corresponding tire corner button to be pushed. If at block 120 the Lock button was pushed the method identifies that the LF tire pressure is to be measured by setting the tire select flag, Tire, to 0, clears 2-minute timer, T_fill, and chirps the horn once to give feedback to the user, at block 122. If the Lock button was not pushed at block 122 the method will determine if the Unlock button was pushed at block 124 and selects the RF at block 126. Block 128 determines if the panic horn button was pushed and selects LR at block 130. Block 132 checks if the trunk release button was pushed and selects the LR at block 134. After checking all function buttons the method resumes normal RFA operation at block 136. Once the verification is active and a corner is selected via FOB push button the method waits up to 2-minutes for the pressure to be measured. IF at block 144 the tire pressure is not measured within two minutes then at block 146 the tire pressure verification mode will be set to false and the horn will chirp three times signaling that the tire pressure verification mode has been cancelled. The method then proceeds to block 136. If the 2-minute time limit has not expired block 148 determines if the fob's tire pressure gauge is transmitting and if it is not it increments the timer at block 150 and proceeds to block 136. If the TPG is transmitting block 152 determines if the tire pressure is greater than or equal to placard pressure. If the tire pressure is not within the placard limit the method clears the timer at block 154 giving the customer an additional 2-minutes to fill the tire or re-measure a bad reading (poor tire valve seating) and jumps to block 136. If the tire meets or exceeds placard pressure block 156 sets the corresponding tire bit in multi-tire variable, T_chair, and chirps the horn, alerting the customer that tire is ok and they are free to move to another tire. If at block 158 all of the tire bits are set and the in-tire TPM sensor is greater than placard the tire characterization is initiated at block 160. Testing the TPM sensor prevents a customer from taking a short cut of measuring one good tire four times. Block 160 initiates all of the tire characterization distances, cancels the tire pressure verification mode, and chirps the horn three time signaling that the procedure has ended.

In an alternative method, the customer is able to activate the tire characterization procedure without utilizing fob buttons. As an overview, if no buttons are present on the key fob, the characterization process starts with reset entry mode (Ignition 2 and odometer reset, etc.) and pressure measurement of all four tires in a specific sequence. The method requires that all 4 tires have a pressure at greater than or equal to 30 psi. This method requires a sequential measurement of LF, RF, RR, and LR tires with a time limit of 2 minutes per corner. Once the pressure for a given tire is at greater than or equal to placard pressure, the method chirps the horn and moves on to next corner. If the tire pressure is less than placard, the method waits 2 minutes for the customer to pressurize the tire. The timer resets to 2 minutes every time a transmit on change of greater than 1 PSI occurs. When all bits equal true and the in-tire TPM sensor is greater than placard the tire characterization is initiated.

Figure 4:
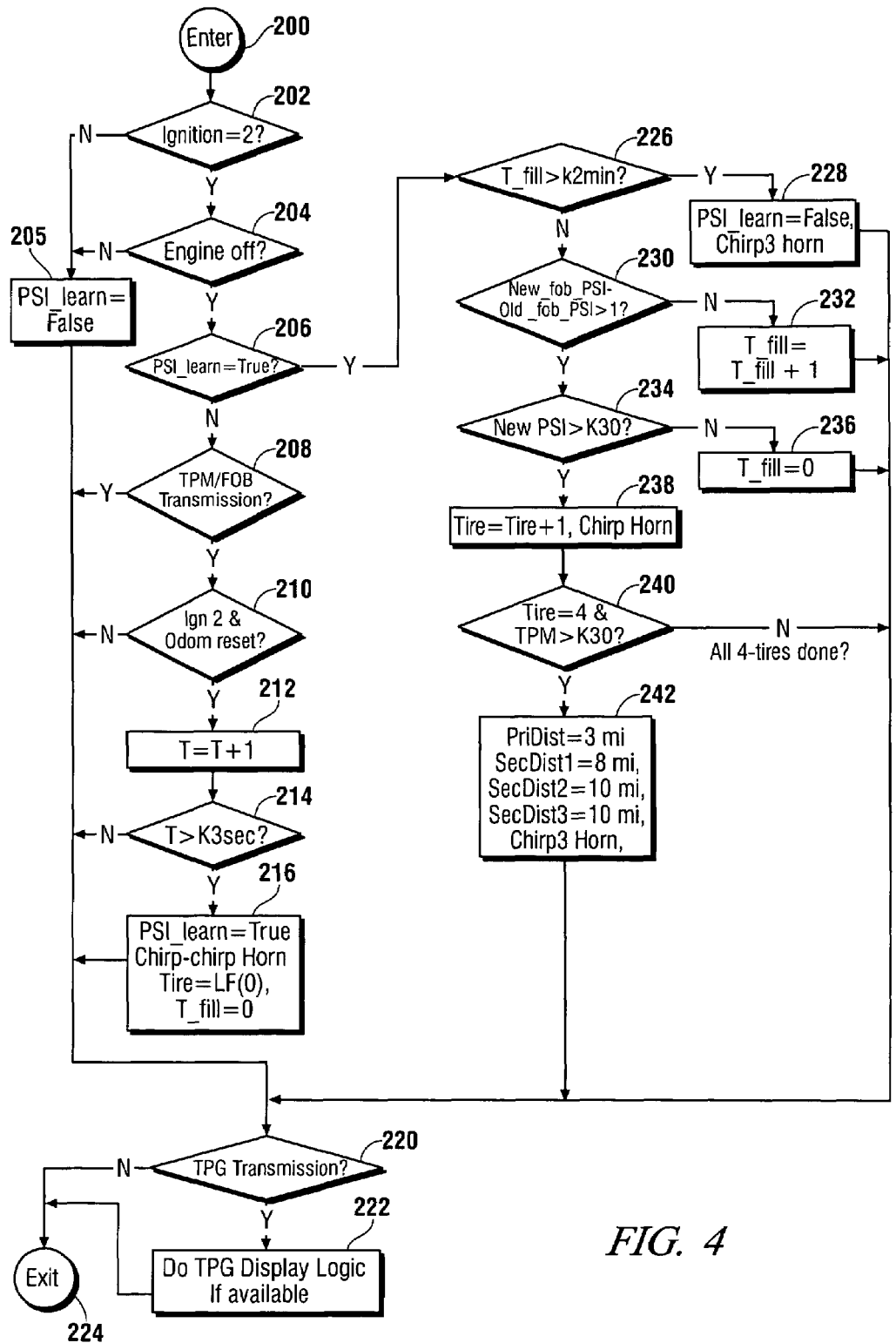
FIG. 4 is a logical flow chart showing a tire characterization method according to an alternative embodiment of the present invention.

FIG. 4 illustrates this alternative method, in which the key fob does not contain specialized buttons for tire characterization, in greater detail. One difference in the method diagrammed in FIG. 4 is that this method requires a predetermined tire pressure measurement sequence (LF, RF, RR, LR). The sequence progresses to the next tire solely on the condition of each corner meeting or exceeding placard pressure. (Other sequences are possible.)

The method begins at block 200. If at block 202 the ignition is in run (ignition 2) and if at block 204 the engine is off the method proceeds to block 206 which determines if the tire pressure verification mode is active. If the ignition is not in run or the engine is running the method automatically sets the status of the verification mode to inactive at block 205 then proceeds to the normal RFA processing at block 220. If at block 206 the tire pressure verification mode is active the method jumps to the corner selection method at block 226. If the mode is inactive block 208 checks for a transmission key from the key fob to the RFA module. If no transmission was received the method proceeds to block 220 which handles the normal functions of the RFA. If the mode is not active the method determines at block 210 if a request to initiate a tire pressure verification mode is being commanded by determining if a customer is holding down the odometer reset button on the IPC. If this button is being held down the method increments a time at block 212. If the button is not being held down the method jumps to block 220. If at block 214 the timer exceeds timer, K2Sec, (about 3-seconds) the method activates the tire pressure verification mode, clears tire fill timer, T_fill, sets tire select flag, Tire, to 0 (Left Front tire), and provides an audible feedback to the customer by chirping the horn twice at block 216. The method then proceeds to RFA function block 220. Once the verification is active and the LF corner is selected the method waits up to 2-minutes for the pressure to be measured. If at block 226 the tire pressure is not measured within two minutes then at block 228 the tire pressure verification mode will be set to false and the horn will chirp three times signaling that the tire pressure verification mode has been cancelled and proceeds to block 220. If the 2-minute time limit has not expired block 230 determines if the FOB's tire pressure gauge is transmitting and if it is not it increments the timer at block 232 and proceeds to block 220. If the TPG is transmitting block 235 determines if the tire pressure is greater than or equal to placard pressure. If the tire pressure is not within the placard limit the method clears the timer at block 236 giving the customer an additional 2-minutes to fill the tire or re-measure a bad reading (poor tire valve seating) and jumps to block 220. If the tire meets or exceeds placard pressure block 238 increments successfully measured tire counter, Tire, and chirps the horn alerting the customer that that tire is ok and they are free to move to the next tire in the sequence (RF). If at block 240 the successful tire counter is equal to 4 tires and the in-tire TPM sensor is greater than placard the tire characterization is initiated at block 242. Testing the TPM sensor prevents a customer from taking a short cut of measuring one good tire four times. Block 242 initiates all of the tire characterization distances, cancels the tire pressure verification mode, and chirps the horn three times signaling that the procedure has ended.

The above logical functionality is preferably embedded in the automobile's computer. Alternatively, the functionality may also be programmed into the key fob.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for authorizing a tire pressure characterization in a vehicle having a motor and an ignition for starting the motor, the method comprising the steps of:
    initiating a tire pressure characterization sequence by placing the ignition in a first position in which the motor of the vehicle is not running and simultaneously depressing the odometer reset button;
    measuring the air pressure in a left front tire with a tire valve stem interface disposed on a key fob;
    setting a flag marker approval corresponding to the left front tire when the air pressure in the left front tire meets or exceeds placard pressure;
    measuring the air pressure in a right front tire with a tire valve stem interface disposed on a key fob;
    setting a flag marker approval corresponding to the right front tire when the air pressure in the right front tire meets or exceeds placard pressure;
    measuring the air pressure in a left rear tire with a tire valve stem interface disposed on a key fob;
    setting a flag marker approval corresponding to the left rear tire when the air pressure in the left rear tire meets or exceeds placard pressure;
    measuring the air pressure in a right rear tire with a tire valve stem interface disposed on a key fob;

setting a flag marker approval corresponding to the right rear tire when the air pressure in the right rear tire meets or exceeds placard pressure;

testing whether flag marker approvals exist for all four tires; and authorizing a characterization when all four tires have flag marker approvals.

2. A method for authorizing a tire pressure characterization of a vehicle comprising the steps of:

measuring the air pressure in a left front tire with a tire valve stem interface disposed on a key fob;

setting a flag marker approval corresponding to the left front tire when the air pressure in the left front tire meets or exceeds placard pressure;

measuring the air pressure in a right front tire with a tire valve stem interface disposed on a key fob;

setting a flag marker approval corresponding to the right front tire when the air pressure in the right front tire meets or exceeds placard pressure;

measuring the air pressure in a left rear tire with a tire valve stem interface disposed on a key fob;

setting a flag marker approval corresponding to the left rear tire when the air pressure in the left rear tire meets or exceeds placard pressure;

measuring the air pressure in a right rear tire with a tire valve stem interface disposed on a key fob;

setting a flag marker approval corresponding to the right rear tire when the air pressure in the right rear tire meets or exceeds placard pressure;

testing whether flag marker approvals exist for all four tires;

authorizing a characterization when all four tires have approved flag markers; and after each of the measuring steps, transmitting tire pressure to a remote function actuator and resetting a timer when, upon a subsequent measurement of air pressure, a transmission to the actuator of a change in pressure of greater than 1 PSI occurs.

3. The method according to claim 1 further comprising the step of determining engine status.

4. The method according to claim 2 further comprising the step of initiating a tire pressure verification mode by simultaneously depressing two keys on a key fob.

5. The method according to claim 1 further comprising the step of providing an audible feedback when the tire pressure characterization sequence is initiated.

* * * * *